United States Patent [19]
Mohr et al.

[11] Patent Number: 5,645,143
[45] Date of Patent: Jul. 8, 1997

[54] ELECTRONICALLY CONTROLLABLE BRAKING SYSTEM FOR GROUND VEHICLES AND METHOD FOR OPERATING SAME

[75] Inventors: Kurt Mohr, Halsenbach/Ehr; Ulrich Seuser, Neuwied, both of Germany

[73] Assignee: Lucas Industries public limited company, United Kingdom

[21] Appl. No.: 622,122

[22] Filed: Mar. 26, 1996

[30] Foreign Application Priority Data

Mar. 30, 1995 [DE] Germany ................ 19511811

[51] Int. Cl.⁶ .............. F16D 65/20; B60T 1/06; B60T 8/00; B60T 13/74
[52] U.S. Cl. .......... 188/72.1; 188/158; 303/113.1; 303/3; 303/15; 303/115.2; 303/162; 303/155; 60/545
[58] Field of Search .............. 188/72.1, 72.4, 188/72.6, 72.8, 72.7, 156, 158, 106 P, 358, 359; 303/115.2, 162, 113.1, 114.1, 113.2, 113.3, 116.1, DIG. 3, DIG. 4, 113.4, 116.4, 155, 3, 15; 60/545

[56] References Cited

U.S. PATENT DOCUMENTS

| 4,435,021 | 3/1984 | Hoenick | 303/116.4 |
|---|---|---|---|
| 4,602,702 | 7/1986 | Ohta et al. | 188/72.1 |
| 4,623,044 | 11/1986 | Ohta et al. | 188/72.1 |
| 4,629,039 | 12/1986 | Imoto et al. | 188/106 P |
| 4,705,323 | 11/1987 | Imoto et al. | 188/72.1 |
| 4,765,140 | 8/1988 | Imoto et al. | 188/72.1 |
| 4,854,424 | 8/1989 | Yamatoh et al. | 188/72.1 |
| 5,000,295 | 3/1991 | Fargier | 188/72.1 |
| 5,000,521 | 3/1991 | Majima et al. | 303/115.2 |
| 5,067,778 | 11/1991 | Tertardi | 303/115.2 |
| 5,348,123 | 9/1994 | Takahashi et al. | 188/72.1 |

FOREIGN PATENT DOCUMENTS

| 3545800A1 | 7/1986 | Germany . |
|---|---|---|
| 3600733A1 | 7/1986 | Germany . |

*Primary Examiner*—Douglas C. Butler
*Attorney, Agent, or Firm*—Wood, Herron & Evans, L.L.P.

[57] ABSTRACT

An electronically controllable braking system for ground vehicles, comprising a cylinder/piston arrangement (6) which is able to introduce friction forces ($F_{akt}$) into a friction element (8) which is coupled with a vehicle wheel by subjecting a hydraulic chamber (4) of the cylinder/piston arrangement (6) with hydraulic fluid, is developed further in that an electrically actuatable displacement element (12) projects into the hydraulic chamber (4) of the cylinder/piston arrangement (6) which is actuatable as a function of control signals from an electronic controller (22) for increasing or decreasing the pressure acting on the hydraulic fluid in the hydraulic chamber (4) in order to increase or decrease, respectively, the friction forces ($F_{akt}$) which, during a braking operation, are introduced into the friction element (8).

17 Claims, 4 Drawing Sheets

ELECTRONICALLY CONTROLLABLE BRAKING SYSTEM FOR GROUND VEHICLES AND METHOD FOR OPERATING SAME

DESCRIPTION

The present invention relates to an electronically controllable braking system for ground vehicles with a cylinder/piston arrangement, by means of which friction forces can be introduced into a friction element which is coupled with a vehicle wheel through the application of a hydraulic chamber of the cylinder/piston arrangement.

This braking system is to be developed further in such a manner that the braking force boost, i.e. the force applied by the driver to the brake pedel, is effected electro-mechanically, with the force to be boosted directly by the respective wheel brake and transmitted via a hydraulic fluid to the brake piston.

In a motor vehicle, generally each vehicle wheel is provided with a braking unit which is constituted by a disk or drum brake as well as with a brake piston. The brake piston acts hydraulically or pneumatically on the disk or drum brake. Each brake piston is either assigned an individual booster, or all brake pistons are controlled by a common brake booster. An electronic controller monitors the behaviour of one or several vehicle wheels with respect to their deceleration or acceleration, respectively. In addition, further parameters of the braking operation, for example, the brake pedal actuation travel, the brake pedel actuation speed, the brake pedal actuation force, are sensed and evaluated. On the basis of these (and, if required, additional) data the electronic controller determines the necessary braking force assistance and activates the brake booster of the respective brake or modulates the braking force of the common brake booster, which is available for all braking units, whereupon the hydraulic braking cylinder pressure as applied solely by the pedal actuation force is boosted accordingly.

For safety reasons, all such known braking systems have a direct hydraulic connection between the pedal-actuated master cylinder and the brake piston in addition to the electronic actuation in order to be able to still actuate the brake in the case of a failure of the electronic system.

From DE 35 45 800 A1 a control apparatus for vehicle brakes is known, wherein a wheel cylinder and a brake cylinder are arranged in the brake caliper of each vehicle wheel. A piezoelectric actuation mechanism is so arranged in the brake caliper that it communicates with the wheel cylinder. When the piezoelectric actuation mechanism is subjected to an electric voltage, a plunger in a sleeve is displaced and changes the volume of the hydraulic fluid in the wheel cylinder. Brake fluid is supplied from a master cyliner via a fluid channel into the brake caliper of the wheel cylinder, said fluid channel being capable of being opened and closed by means of a control valve. Under a high pressure in the brake cylinder the piezoelectric actuation mechanism expands and the control valve closes. Subsequently, the electric voltage at the piezoelectric actuation mechanism is reduced so that the pressure in the wheel cylinder is reduced. The plunger guided in the sleeve must be supported in a fluid-tight and low-friction manner in order to enable an actuation of the brake piston with minimum delay. This causes high manufacturing costs and an intricate assembly.

From DE 36 00 733 A1 a similar control apparatus for vehicle brakes is known, wherein a brake piston with a piezoelectric piston arrangement in its interior is arranged within the wheel cylinder. The brake piston (together with the piezoelectric piston arrangement) is hereby initiated by a master cylinder to effect a feed motion of the brake by means of hydraulic fluid. Under the influence of the hydraulic fluid, the brake piston together with the piezoelectric piston arrangement travels in the wheel cylinder. The piezoelectric piston arrangement which acts immediately on a brake pad can be activated in addition to the hydraulically caused feed motion. With this arrangement, too, guidance and support of the piezoelectric piston arrangement in the brake piston are also critical with respect to the fluid-tight sealing and the low-friction and low-inertia guidance and support.

The invention is based on the object to improve the above described arrangements with respect to their life and safety and to suitably design them in order to enable economical and efficient mass production.

According to the invention this is achieved in such a way that an electrically actuatable displacement element projects into the hydraulic chamber of the cylinder/piston arrangement which can be operated as a function of control signals from an electronic controller for increasing or decreasing the pressure acting on the hydraulic fluid in the hydraulic chamber in order to increase or decrease, respectively, the friction forces which are introduced into the friction element during a braking operation.

The friction element can be the disk of a disk brake as well as the drum of a drum brake.

In a preferred embodiment of the invention the displacement element can be actuated by an actuator which can be driven by the control signals from the electronic controller. This actuator is preferably constituted by a linear drive in the form of a piezoelectric positioning unit for increasing or decreasing the pressure upon the hydraulic fluid in the hydraulic chamber. Other designs of the actuator are also possible. Major aspects in the selection of an actuator are a low-delay response behaviour, high operational safety, high positioning forces and a relatively low current consumption. The short positioning travel, such as can be achieved with a piezoelectric positioning unit, does not play a negative role because within the scope of a hydraulic transmission this must be adapted anyway to the actual conditions.

In a currently preferred embodiment the displacement element is formed by a preferably metallic diaphragm which, as a function of the control signals, can be deformed and/or displaced by the actuator, thereby increasing or decreasing the pressure acting on at least part of the hydraulic fluid in the hydraulic chamber. This (metallic) diaphragm can be rigidly coupled with the actuator, or the actuator or an actuation element, respectively, coupled with same may first have to overcome an idle travel before the diaphragm is actuated. Depending on the shape and the rigidity profile of the diaphragm, this can be deformed and/or displaced upon the actuation of the diaphragm by the actuator.

In another currently preferred embodiment the displacement element is formed by a preferably metallic bellows which can be deformed and/or displaced by the actuator as a function of the control signals, thereby increasing or decreasing the pressure acting on the hydraulic fluid in the hydraulic chamber. Similar to the diaphragm, this bellows permits a considerable volume change or a corresponding pressure change, respectively, which can be introduced into the hydraulic fluid by a small stroke of the actuator.

Depending on the area or volume ratios between the bellows or the diaphragm, respectively, and the hydraulic chamber, the braking means can be actuated very directly and with a minimum of delay.

In order to prevent a reaction on the brake cylinder or the brake pedal actuating same, a valve arrangement can preferably be provided which, during an actuation of the displacement element for a pressure increase in the hydraulic fluid, prevents draining of the hydraulic fluid from at least one region of the hydraulic chamber. Thus the pressure increase causes (exclusively) an increase of the friction forces introduced into the friction element and does not urge the brake pedal against the foot of the driver.

The hydraulic chamber is preferably divided into a first and a second region by the displacement element, the two regions being connected to each other via the valve arrangement. One of the two regions is closed upon closing of the valve arrangement, the closing of the valve arrangement being preferably effected upon an actuation of the actuator for a pressure increase in the hydraulic fluid. This permits a particularly easy specification of the characteristics of the braking system because this enables the volumes to be moved to be determined. This also makes it possible to easily define the required positioning travel for a certain friction force.

When, in the course of a braking operation, the hydraulic fluid is supplied by a brake cylinder, which is actuatable by a brake pedal into the second region of the hydraulic chamber, from there into the first region where it acts upon the friction element, it is ensured that sufficient hydraulic fluid in the braking unit is available at any time. Moreover, a particularly high level of safety is obtained with relatively low design expenditure, because in the case of an actuator failure, a solely mechanical actuation of the brake is still possible for the displacement element.

The closing operation of the valve arrangement is preferably completed when the actuator deforms and/or displaces the displacement element to increase the pressure in the hydraulic fluid. This ensures that no hydraulic fluid flows back through the valve arrangement. Rather, the entire pressure/volume change is available for the increase of the friction force.

In a particularly preferred embodiment of the invention the diaphragm has a convex bulge which along its circumference is clamped in the cylinder and the convex bulge of which faces an actuation element of the actuator. It is thereby possible to achieve a very sensitive adjustment of the brake characteristics via a corresponding selection of strength, formability and shape.

A particularly simple embodiment of the invention provides an opening in the centre of the displacement element, which together with a closing element which is connected with the actuator forms the valve arrangement, the closing element being dimensioned in such a manner and arranged relative to the opening that is does not contact the displacement element in the non-actuated position and clears the opening, and in the actuated position closes the opening and deforms and/or displaces the displacement element for increasing the pressure of the hydraulic fluid in the closed region. Thus the individual components have several functions. This is particularly advantageous with respect to the ease of assembly, susceptibility to failures and maintenance.

In another embodiment the valve arrangement is arranged outside of the hydraulic chamber.

The invention also relates to a method for the operation of an electronically controllable braking system for ground vehicles, wherein for a braking operation a hydraulic chamber of a cylinder/piston arrangement is subjected to hydraulic fluid from a brake cylinder actuated by a brake pedal in such a manner that friction forces are introduced into a friction element which is coupled with a vehicle wheel, parameters of the braking operation are sensed by means of an electronic control means and sensors connected with same, optimum friction forces for the braking operation are determinded from the parameters of the present braking opeation, the friction forces determined to be optimum are compared with the friction forces introduced into the friction element, and control signals for an actuator are generated if the sensed parameters indicate that the friction forces introduced into the friction element are not in accordance with the friction forces determined to be optimum, with the actuator acting upon a displacement element which is movable for increasing or decreasing the pressure applied to the hydraulic fluid in the hydraulic chamber in order to increase or reduce, respectively, the friction forces introduced into the friction element in such a manner that the friction forces determined to be optimum are introduced into the friction element.

This operation has proven to be particularly advantageous in that it permits an operation without electronic assistance as well as a modulation of the brake pressure in the positive and/or negative direction so that an application in cruise control systems, ABS, ASC systems, and cruise dynamic control systems is possible.

The sensed paramaters include preferably one or several of the following values: friction forces introduced into the friction element, brake pedal actuation force, brake pedal actuation travel, vehicle wheel speed, vehicle wheel deceleration, and pressure in the hydraulic chamber.

The friction forces determined as optimum for a braking operation can, for ABS and ASC systems, in particular, be constituted by a sequence of different friction force values of identical or different duration.

Further properties, characteristics and advantages of the invention will become apparent from the following description of three embodiments according to the invention.

Figure 1:
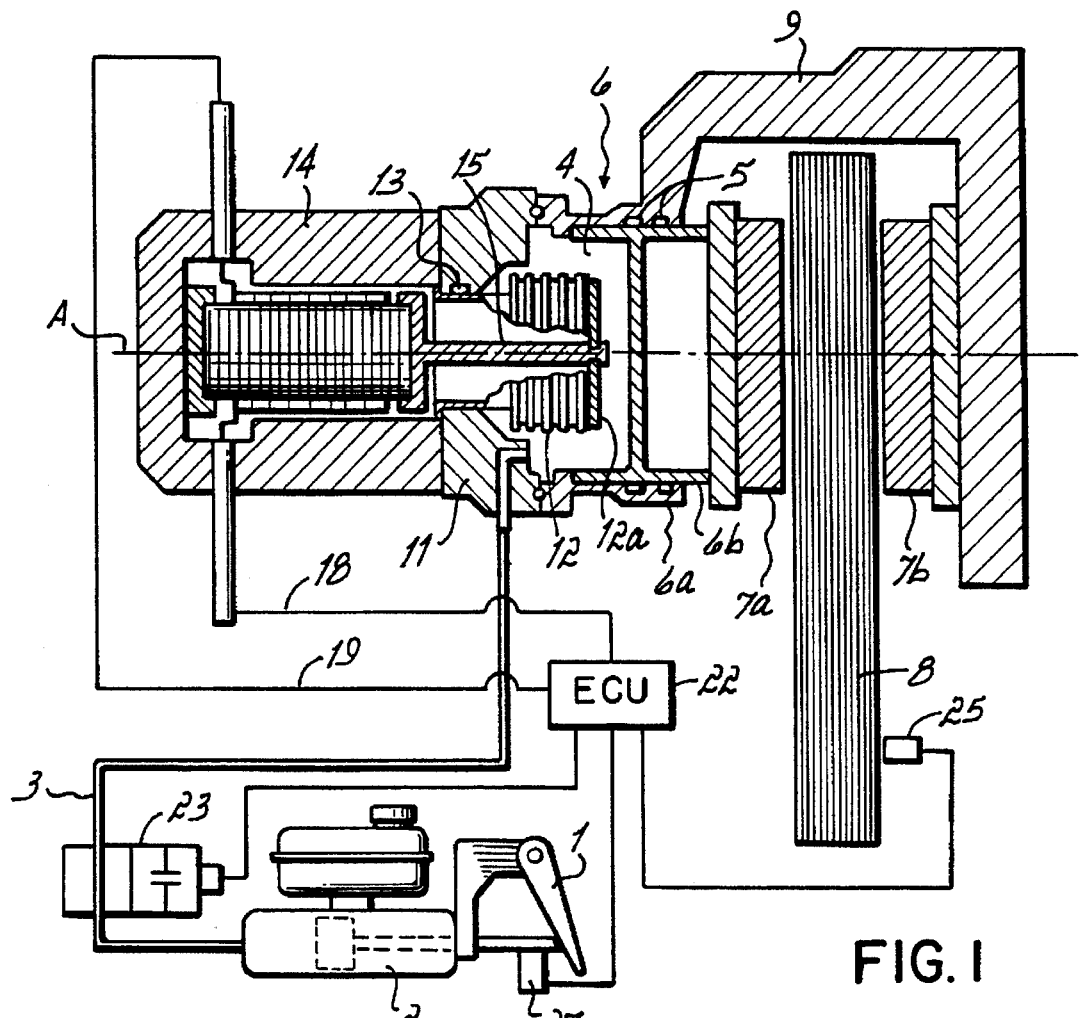
FIG. 1 shows a first embodiment of an electronically controlled braking system, with only one braking unit illustrated in a schematic sectional side view.
Figure 1A:
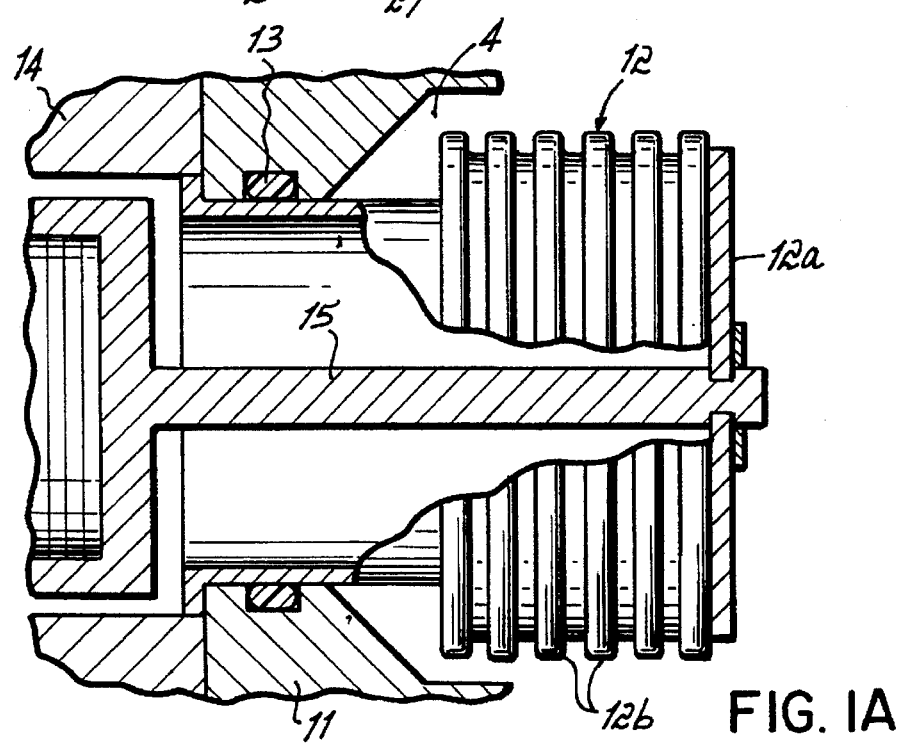
FIG. 1a shows an enlarged schematic sectional detailed side view of a displacement element of the braking unit according to FIG. 1.

FIGS. 1, 1a show a first embodiment of a braking system according to the invention, wherein a master cylinder 2 which can be actuated by a brake pedal 1 is connected with a hydraulic chamber 4 of a cylinder/piston arrangement 6 via a hydraulic line 3. The cylinder/piston arrangement 6 is formed by a brake cylinder 6a which houses an axially slidable brake piston 6b which is sealed in a fluid-tight manner by a circumferential seal 5. The brake piston 6b carries a brake pad 7a at its free end, which together with a second pad 7b acts on two opposing surfaces of a brake disk 8 formed as a friction element. A wheel brake caliper 9 is integrally connected with the brake cylinders 6a, encompasses the brake disk 8 and carries the second brake pad 7b.

A displacement element 12 in the form of a bellows with an essentially cylindrical shape extends through a bottom 11 of the brake cylinder 6a facing away from the brake disk 8 and is expandable and contractable at an end 12a projecting into the hydraulic chamber 4. The displacement element 12 is accommodated in the bottom 11 of the brake cylinder 12a in a rigid and fluid-tight manner (by a circumferential sealing ring 13). At the outside of the bottom 11 of the brake cylinder 6a an actuator 14 is flange-mounted, which is designed as a linear drive in the form of a piezoelectric positioning unit. The design and operation of such a piezoelectric positioning unit is known per se, for example from DE 36 00 7331 A1 or DE 35 45 800 A1.

At the end of the actuator 14 facing the bottom 11 of the brake cylinder 6a the piezoelectric positioning unit has an actuation element 15, which penetrates the bottom 11 and projects into the interior of the displacement element 12 and is rigidly connected with the free end 12a of same. When the actuator 14 is supplied with control signals from an electronic control unit 22 via two lines 18 and 19, the actuation element 15 moves along a common axis A of the actuator 14 and the cylinder/piston arrangement 5 and causes an expansion or contraction of the displacement element 12 in the hydraulic chamber 4.

In order to prevent the hydraulic fluid in the hydraulic chamber 4 from being forced back into the master cylinder 2 via the hydraulic line 3 due to the expansion of the displacement element 12, a 2-way solenoid valve 23 is arranged in the hydraulic line 3, which under the control of the electronic control unit 22 is able to block the hydraulic line 3 against the master cylinder 2. The electronic control unit 22 is connected with a sensor 25 for sensing the vehicle wheel speed or the vehicle wheel deceleration (at the brake disk 8), respectively, and with a sensor 27 for sensing the brake pedal actuation force, the brake pedal actuation travel or the brake pedal actuation speed, respectively.

For braking, the driver actuates the brake pedal 1 and displaces the piston of the master cylinder 2 by means of the force applied by his foot, so that the displaced hydraulic fluid is pressed into the hydraulic chamber 4 of the cylinder/piston arrangement 6 via the hydraulic line 3 and through the opened 2-way solenoid valve 23. The hydraulic pressure which is built up in the hydraulic chamber 4 displaces the brake piston 6b and forces the brake pad 7a against the brake disk 8. The other brake pad 7b is also forced against the opposite side of the brake disk 8 via the brake caliper 9. The friction forces $F_{akt}$ thus introduced into the brake disk 8 cause a certain vehicle wheel deceleration which can be sensed by the sensor 25. From the simultaneously and continuously measured values of the brake pedal actuation force and/or the brake pedal actuation speed, the electronic control unit 22 determines a braking friction force, the magnitude of which is intended by the driver, which is converted into corresponding control signals for the actuator 14.

Thereupon, the actuator 14 moves the actuation element 15 along the axis A towards the hydraulic chamber 4 so that the bellows of the displacement element 12 expands. This implies a volume increase and thus an increase of the pressure in the hydraulic chamber 4. The brake piston 6b is consequently further forced towards the brake disk 8. While the actuator 14 is supplied with control signals for increasing the pressure, the 2-way solenoid valve 23 is blocked by the electronic control unit 22. Determination of the braking friction force desired by the driver can be carried out in the electronic control unit 22 either via a family of characteristics or by calculations which are carried out continuously. Due to the fact that the displacement element 12 occupies a relatively large portion of the cross-sectional area of the hydraulic chamber 4, relatively short and rapid positioning strokes can result in a high pressure increase or pressure reduction rate, respectively, in the hydraulic chamber 4, which, in turn, leads to very rapid changes of the friction force acting on the brake disk 8. If the braking friction force desired by the driver were to result in an excessive vehicle wheel deceleration which the vehicle wheel would no longer be capable of transferring to the road surface, i.e. the vehicle wheel is locked, it is necessary to limit the pressure occurring in the hydraulic chamber 4 to a non-hazardous value. If the vehicle wheel suddenly blocks because of a change in the road surface condition, it is necessary to reduce the prevailing pressure accordingly.

For this purpose, the electronic control unit 22 determines an optimum braking force $F_{opt}$ from the parameters sensed by the sensors 25 and 27 and converts them to corresponding control signals at the actuator 14. Due to the fact that the actuation element 15 of the actuator 14 is rigidly connected with the free end of the bellows 12, the actuator 14 can effect the already described pressure increase in the hydraulic chamber 4 as well as provide for specific pressure reductions by means of an axial movement in the opposite direction. With a movement of the actuation element 15 for a pressure reduction in the hydraulic chamber 4, the 2-way solenoid valve 23 can also be opened by the electronic control unit 22 so that the hydraulic fluid is able to flow into the master cylinder 2 or its compensating reservoir, respectively, via the hydraulic line 3. With a movement of the actuation element 15 for a pressure reduction in the hydraulic chamber 4, folds 12b (see FIG. 1a) of the bellows 12 are contracted so that the volume of the displacement element 12 and thus the pressure in the hydraulic chamber 4 are decreased correspondingly.

With the braking system according to the invention it is possible to force so much hydraulic fluid from the master cylinder 2 into the hydraulic chamber 4 with one brake pedal actuation that the brake piston 6b overcomes the brake release clearance and the two brake pads 7a, 7b come into contact (and into frictional engagement, if required) with the brake disk 8. The application of the brake pads 7a, 7b with an additional contact force at the brake disk 8 in order to generate a friction force is then effected through the activation of the actuator 14 by the electronic control unit 22, which will then cause an expansion or a contraction of the displacement element 12 in the hydraulic fluid in the hydraulic chamber 4.

Figure 2:
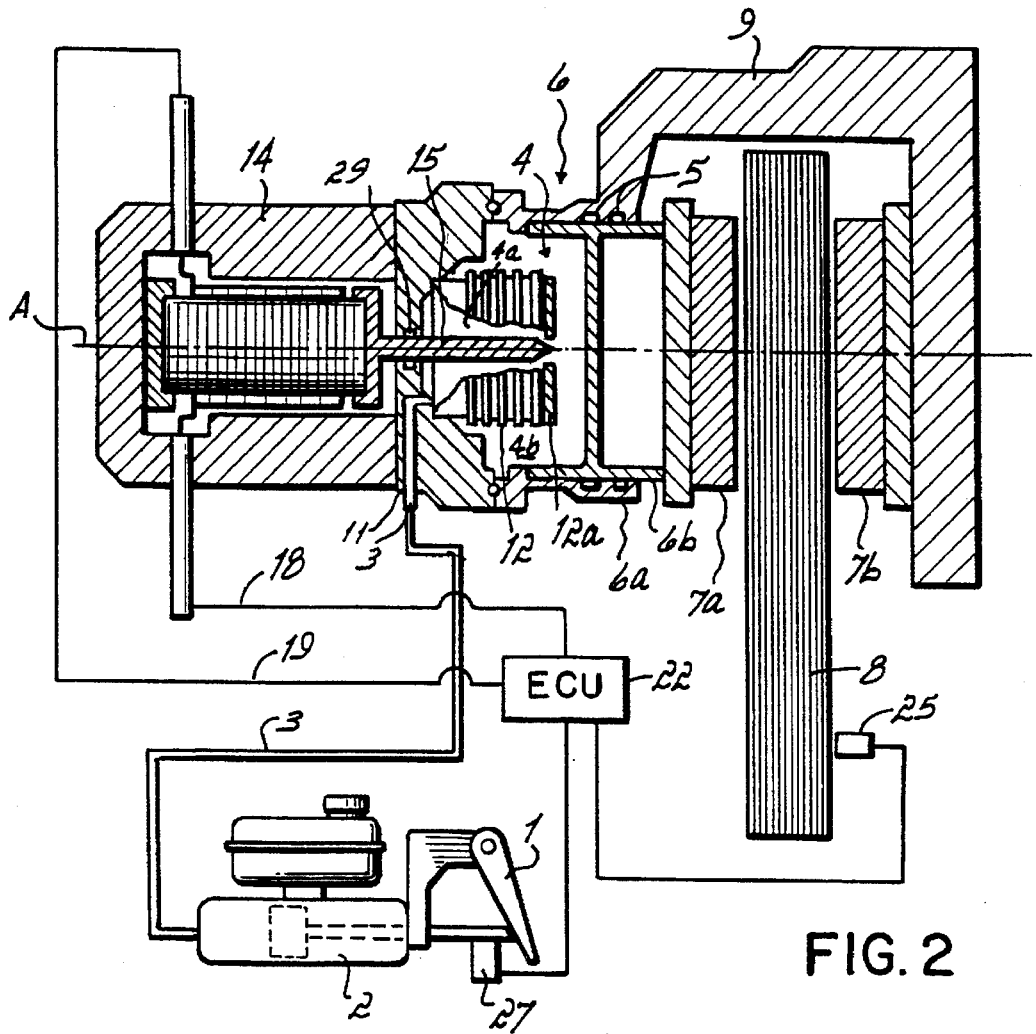
FIG. 2 shows a second embodiment of an electronically controlled braking system, with only one braking unit illustrated in a schematic sectional side view.
Figure 2A:
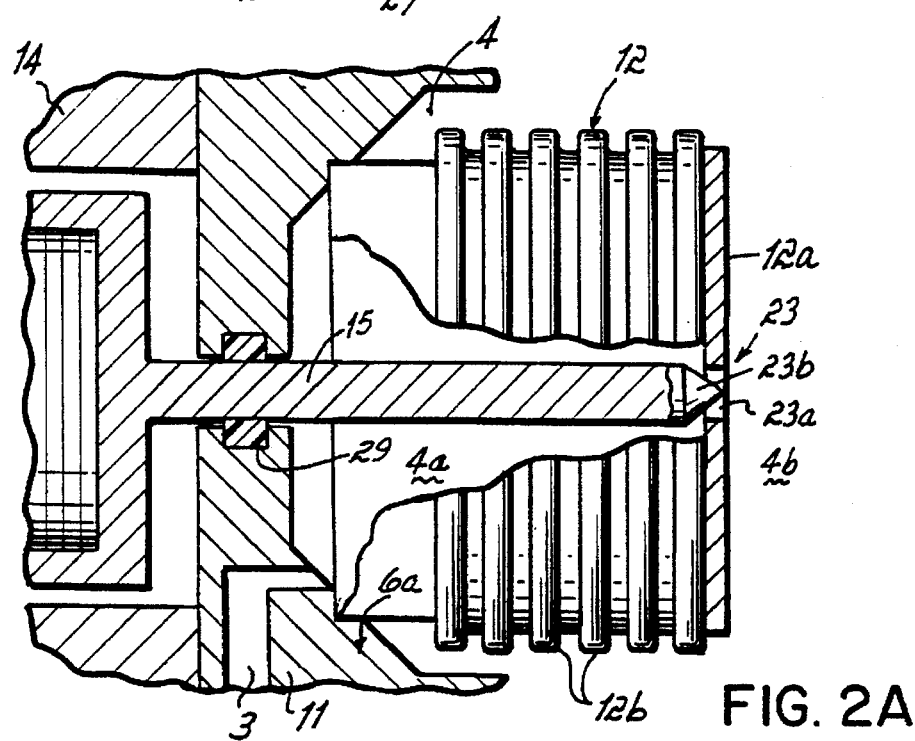
FIG. 2a shows an enlarged schematic sectional detailed side view of a displacement element of the braking unit according to FIG. 2.

FIGS. 2, 2a show a second embodiment of a braking system according to the invention. Identical parts or parts with identical functions, respectively, as shown in FIGS. 1, 1a have the same reference numerals and will not be described again in the following. The main difference as compared to the embodiment according to FIGS. 1, 1a is that the 2-way solenoid valve 23 from FIG. 1 is arranged in the interior of the hydraulic chamber 4. Moreover, the hydraulic chamber 4 is divided into a first and a second region 4a, 4b by the displacement element 12. The two regions 4a, 4b are connected with each other by the valve arrangement 23. As can best be seen from FIG. 2a, the valve arrangement 23 is formed by an opening 23a which is provided in the centre of a face plate which constitutes the free end 12a of the displacement element 12. Said opening 23a is aligned with the actuation element 15 of the actuator 14. The actuation element 15 has a conical taper at its end 23b facing the opening 23a. This conical end 23b forms a closing member for the opening 23a and is dimensioned and arranged relative to the opening 23a in such a way that it does not contact the displacement element in the non-actuated position of the actuator and clears the opening 23a, while it closes the opening 23a in the actuated position of the actuator, and the displacement element is forced into its expanded position.

The end of the cylindrical displacement element 12 facing the bottom 11 of the hydraulic chamber 4 is connected rigidly and in a fluid-tight manner with the wall of the brake cylinder 6a. This makes it possible to omit the seal 13 from FIG. 1. Instead of this, a sealing ring 29 is provided in the bottom 11 of the brake cylinder 6a, which seals the through hole for the actuation element of the actuator 14. The hydraulic line 3 opens into the bottom 11 of the brake cylinder 6a and has an opening 3a which connects the interior of the displacement element 12 and thus the first region 4a with the hydraulic line 3.

Upon an activation of the actuator 14 by the electronic control unit 22, the valve arrangement 23 is closed (inevitably) so that the second region 4b in the hydraulic chamber 4 is closed against the connecting line 3 at that moment in which the displacement element 12 is expanded by the actuation element 15 of the actuator 14. Thus a separate activation of the valve arrangement 23 by the electronic control unit 22 is omitted. As soon as the actuator 14 retracts the actuation element 15 into its non-actuated position, the opening 23a is cleared by the closing member 23b and hydraulic fluid from the second region 4b of the hydraulic chamber 4 is able to flow through the connecting line 3 towards the master cylinder 2 (or its compensating reservoir, respectively) so that the pressure acting on the brake pads 7b decreases.

Figure 3:
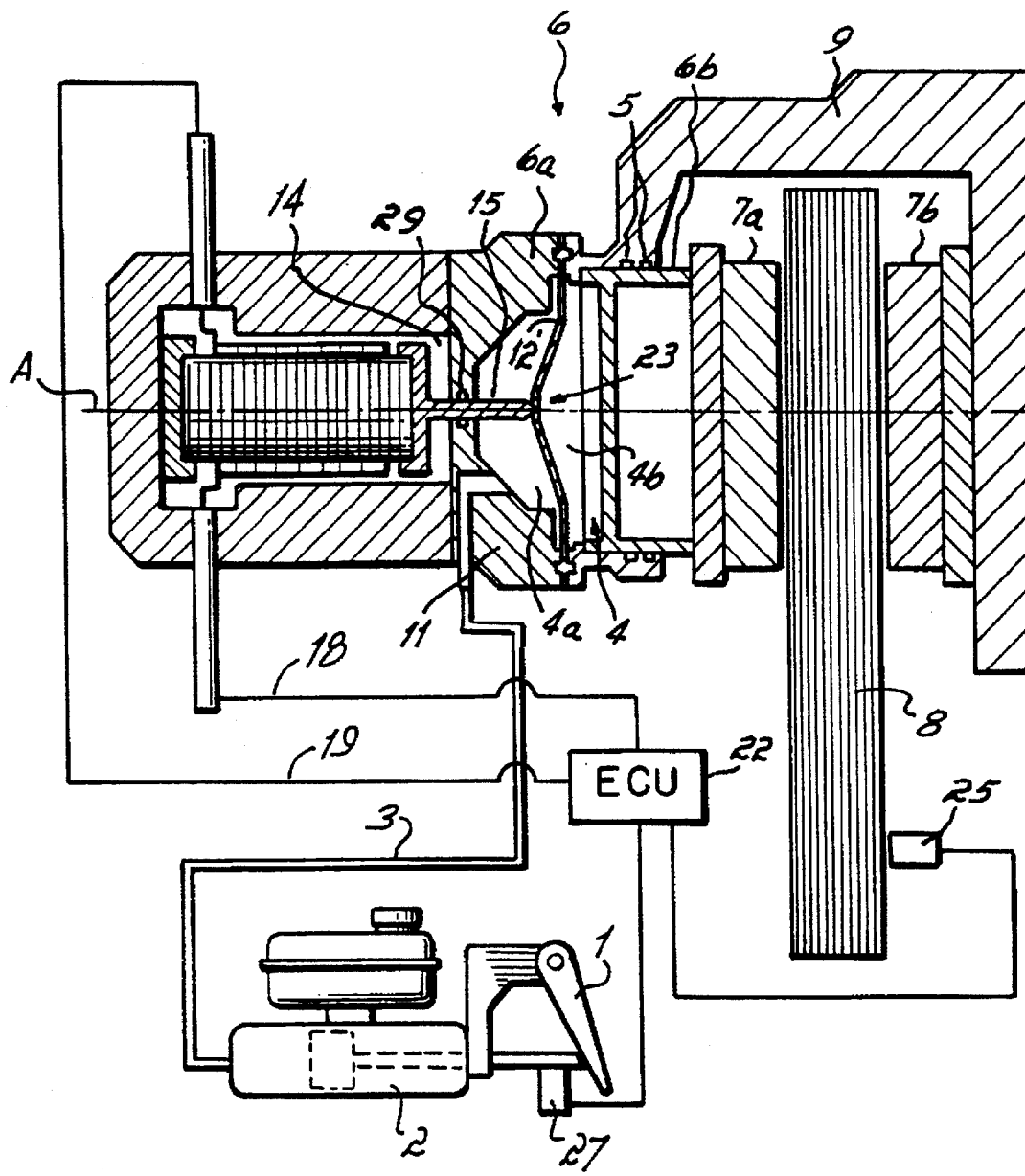
FIG. 3 shows a third embodiment of an electronically controlled braking system, with only one braking unit illustrated in a schematic sectional side view.
Figure 3A:
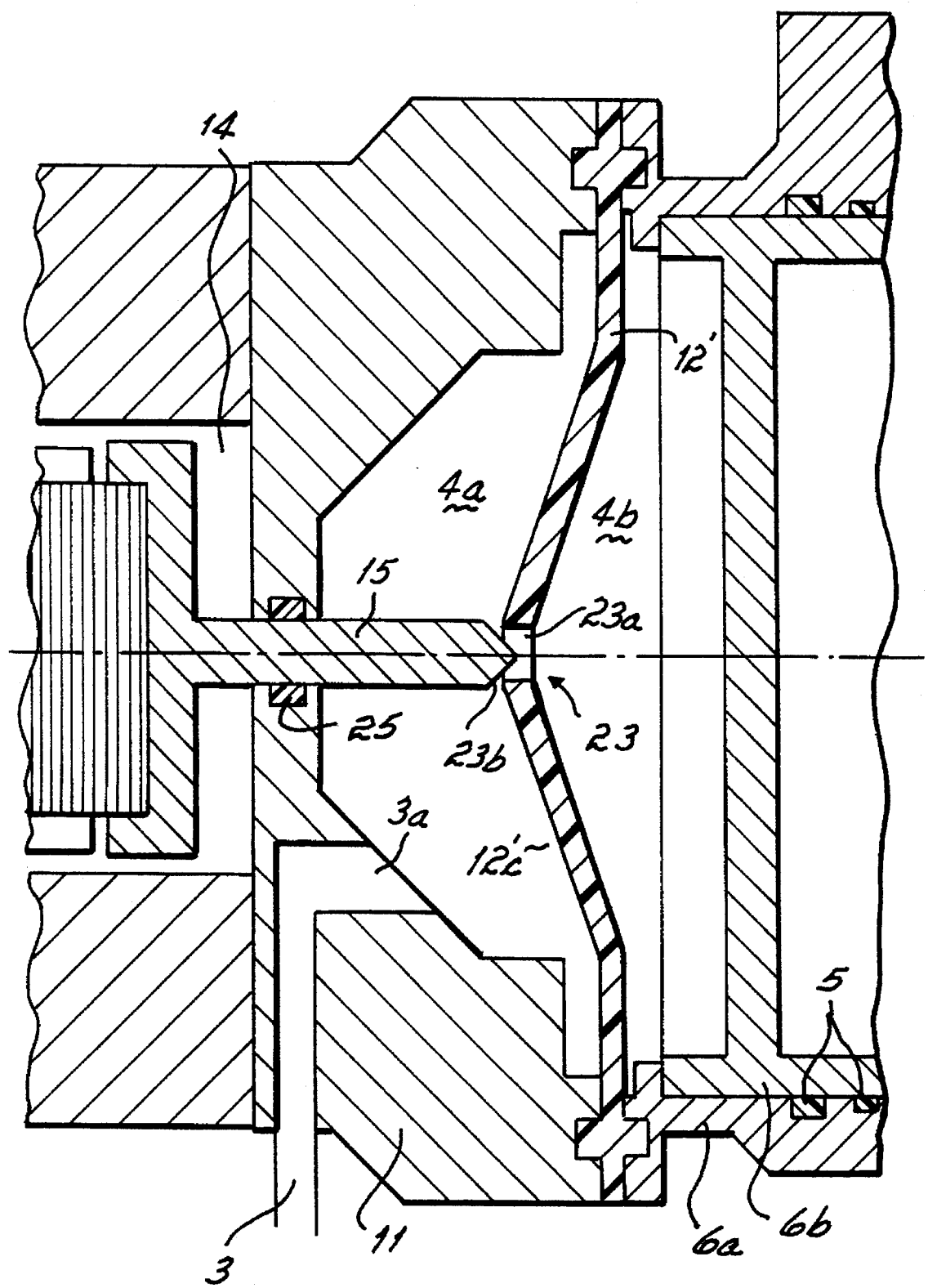
FIG. 3a shows an enlarged schematic sectional detailed side view of a displacement element of the braking unit according to FIG. 3.

Otherwise, functioning and operation correspond to those of the embodiment according to FIGS. 1, 1a. FIGS. 3, 3a illustrate another embodiment of the invention. Parts which in their shape and/or function correspond to those in FIGS. 1, 1a or 2, 2a, respectively, are assigned identical reference numerals and their repeated detailed description is omitted.

The essential difference to the embodiments according to FIGS. 1, 1a and 2, 2a, respectively, is that the essentially cylindrical displacement element with the bellows 12 is replaced by an approximately cup-shaped diaphragm 12' which separates the two regions 4a, 4b in the hydraulic chamber 4. The diaphragm 12' has a bulge 12'c which is formed convexly towards the bottom 11 of the brake cylinder 6a. Upon the movement of the actuation element 15 of the actuator 14 towards the diaphragm 12', the closing member 23b closes the opening 23a in the diaphragm 12'. When the actuation element 15 is moved further, the diaphragm is deformed or displaced, respectively, to achieve a pressure increase in the region 4b of the hydraulic chamber 4.

Otherwise, functioning and operation of this embodiment correspond to a great extent to the embodiment according to FIGS. 2, 2a.

For those with skill in the art it is obvious that a combination of the embodiments of FIGS. 1, 1a and 3, 3a is also possible. This means that the actuation element 15 is also capable of being coupled rigidly and in a fluid-tight manner with the diaphragm 12' instead of the valve arrangement 23 arranged in the hydraulic chamber 4, and the 2-way valve 23 from FIG. 1 can be connected into the hydraulic line 3 of FIG. 3.

The advantage of the separate valve arrangement is that the stroke of the actuator 14 is converted completely to a pressure increase in the region 4b of the hydraulic chamber 4 and that it is not necessary to first overcome part of a valve closing travel.

It is, however, also possible to increase the actuation stroke of the actuation element 15 in such a manner that the actuator 14 does not directly actuate the actuation element 15 which is effected by a corresponding hydraulic and lever arrangement so that the travel of the actuation element is able to be increased.

We claim:

1. An electronically controllable braking system for ground vehicles, comprising a cylinder/piston arrangement (6) which is able to introduce friction forces ($F_{akt}$) into a friction element (8) which is coupled with a vehicle wheel, by subjecting a hydraulic chamber (4) of the cylinder/piston arrangement (6) with hydraulic fluid, an electrically actuatable displacement element (12) projecting into the hydraulic chamber (4) of the cylinder/piston arrangement (6), which is actuatable as a function of at least one control signal from an electronic controller (22), for increasing or decreasing the pressure acting on the hydraulic fluid in the hydraulic chamber (4) in order to increase or decrease, respectively, the friction forces ($F_{akt}$) which, during a braking operation, are introduced into the friction element (8); and a valve arrangement (23) integrated with the displacement element (12), the valve arrangement (23) including an opening (23a) formed in the displacement element (12), so that during an actuation of the displacement element (12) for increasing the pressure of the hydraulic fluid, the valve arrangement (23) prevents draining of the hydraulic fluid from at least one region (4b) of the hydraulic chamber (4).

2. An electronically controllable braking system for ground vehicles according to claim 1, characterized in that the displacement element (12) is actuatable by an actuator (14) which can be driven by the at least one control signal from the electronic controller (22), for increasing or decreasing the pressure acting on the hydraulic fluid in the hydraulic chamber (4).

3. An electronically controllable braking system for ground vehicles according to claim 2 wherein the actuator (14) is a linear drive in the form of a pierzoelectric positioning unit.

4. An electronically controllable braking system for ground vehicles according to claim 1, characterized in that the displacement element is constituted by a diaphragm (12') which can be deformed and/or displaced by the actuator (14) as a function of the at least one control signal, thereby increasing or decreasing the pressure acting on at least part of the hydraulic fluid in the hydraulic chamber (4).

5. An electronically controllable braking system for ground vehicles according to claim 4 wherein the displacement element comprises a metallic diaphragm (12').

6. An electronically controllable braking system for ground vehicles according to claim 1, characterized in that the displacement element is constituted by a metallic bellows (12) which can be deformed and/or displaced by the actuator (14) as a function of the at least one control signal, thereby increasing or decreasing the pressure acting on the hydraulic fluid in the hydraulic chamber (4).

7. An electronically controllable braking system for ground vehicles according to claim 1, characterized in that
the hydraulic chamber (4) is divided by the displacement element (12) into a first and a second region (4a, 4b), with the two regions (4a, 4b) being connected by the valve arrangement (23a, 23b), and one region (4b) of which is closed upon-closing of the valve arrangement (23a, 23b).

8. An electronically controllable braking system for ground vehicles according to claim 7, characterized in that
during a braking operation the hydraulic fluid is supplied from a master cylinder (2), which can be actuated by a brake pedal (1), into the second region (4b) of the hydraulic chamber (4).

9. An electronically controllable braking system for ground vehicles according to claim 7, characterized in that
the closing operation of the valve arrangement (23a, 23b) is completed when the actuator (14) deforms and/or displaces the displacement element (12) in order to achieve a pressure increase in the hydraulic fluid.

10. An electronically controllable braking system for ground vehicles according to claim 7 wherein the closing of the valve arrangement (23a, 23b) affected upon an actuation of the actuator (14) for increasing the pressure in the hydraulic fluid which is applied by the actuator (14).

11. An electronically controllable braking system for ground vehicles according to claim 1 characterized in that
the diaphragm (12') comprises a convex bulge (12'c), is clamped in the cylinder (6a) along a circumference of the diaphragm (12') and the convex bulge (12'c) faces an actuation element (15) of the actuator (14).

12. An electronically controllable braking system for ground vehicles according to claim 1, characterized in that
the valve arrangement (23) includes the opening (23a) in the displacement element (12) and a closing member (23b) connected with the actuator (14), with the closing member (23b) being dimensioned and arranged relative to the opening (23a) in such a way that it does not contact the displacement element (12, 12') in the non-actuated position of the actuator (14), thereby to clear the opening (23a) and to permit flow of hydraulic fluid between opposite sides of the displacement element (12, 12'), and the closing member (23b) does contact the displacement element (12, 12') to close the opening (23a) in the actuated position of the actuator (14), and deforms and/or displaces the displacement element (12, 12') to achieve a pressure increase in the closed region (4b) of the hydraulic chamber (4).

13. An electronically controllable braking system for ground vehicles according to claim 1, characterized in that
the valve arrangement (23) is arranged outside the hydraulic chamber (4).

14. A method for operating an electronically controllable braking system for ground vehicles, comprising the steps of:
subjecting a hydraulic chamber (4) of a cylinder/piston arrangement (6a, 6b) to hydraulic fluid from a master cylinder (2) upon actuation by a brake pedal (1) in such a manner that friction forces ($F_{akt}$) are introduced into a friction element (8) which is coupled with a vehicle wheel;

sensing at least one parameter of the braking operation via sensors (25, 27) operatively connected to an electronic controller (22);

determining optimum friction forces ($F_{opt}$) based on the at least one parameter of the current braking operation;

comparing the friction forces ($F_{opt}$) determined to be optimum with the friction forces ($F_{akt}$) introduced into the friction element (8); and generating control signals for an actuator (14) if the sensed at least one parameter indicates that the friction forces ($F_{akt}$) introduced into the friction element (8) are not in accordance with the friction forces ($F_{opt}$) determined to be optimum; and in response to the generated signals, causing the actuator (14) to act upon a displacement element (12), which is movable for increasing or decreasing the pressure of the hydraulic fluid in the hydraulic chamber (4), in order to increase or decrease, respectively, the friction forces ($F_{akt}$) introduced into the friction element (8) in such a manner that the friction forces ($F_{opt}$) determined to be optimum are introduced into the friction element (8).

15. A method for operating an electronically controllable braking system for ground vehicles according to claim 14, characterized in that
the sensed at least one parameter includes at least one of the following: friction forces ($F_{akt}$) introduced into the friction element (8), brake pedal actuation force, brake pedal actuation travel, vehicle wheel speed, vehicle wheel deceleration, pressure in the hydraulic chamber, voltage applied to the actuator (14) and/or current flowing through the actuator (14).

16. A method for operating an electronically controllable braking system for ground vehicles according to claim 15, characterized in that
the friction forces ($F_{opt}$) determined to be optimum for a braking operation are constituted by a sequence of different friction force values, wherein the duration of the friction force values is one of the following: identical and different.

17. A method for operating an electronically controllable braking system for ground vehicles according to claim 14, further comprising the step of:
closing a valve arrangement (23) separating/connecting at least part of the hydraulic fluid in the hydraulic chamber from/with a brake cylinder before the actuator (14) deforms and/or displaces the displacement element (12), thereby to achieve a pressure increase in the hydraulic fluid in the closed region (4b).

* * * * *